11/19/85 XR 4,554,459

United States Patent [19]

Tsutsumi et al.

[11] Patent Number: 4,554,459

[45] Date of Patent: Nov. 19, 1985

[54] MONITORING SYSTEM FOR A PREDETERMINED FIELD OF VIEW

[75] Inventors: Suteo Tsutsumi; Hiroshi Koh, both of Kyoto, Japan

[73] Assignee: Fujitec Co., Ltd., Japan

[21] Appl. No.: 331,089

[22] Filed: Dec. 15, 1981

[30] Foreign Application Priority Data

Jan. 27, 1981 [JP] Japan ................................. 56-10997

[51] Int. Cl.[4] ...................... G02B 13/18; G08B 13/18

[52] U.S. Cl. .................................. 250/550; 250/221; 350/451

[58] Field of Search ............... 250/550, 237 R, 237 G, 250/221; 340/555, 556, 573, 19 R; 350/436, 451, 452

[56] References Cited

U.S. PATENT DOCUMENTS 2,198,725 4/1940 Smith .
3,168,164 2/1965 Kiely .
3,444,544 5/1969 Pearson et al. .
3,549,302 12/1970 Fraige ............................ 350/436 X
3,803,572 4/1974 Campman .
3,824,392 7/1974 Tibbling .
3,972,021 7/1976 Leitz et al. ................ 250/237 G X
4,052,616 10/1977 Keller ............................ 250/221 X
4,258,255 3/1981 Guscott .............................. 250/221
4,367,016 1/1983 Willhelm ............................. 350/452

*Primary Examiner*—Edward P. Westin
*Attorney, Agent, or Firm*—Jackson & Jones

[57] ABSTRACT

A lift control system includes a spatial filter for producing a signal having various features, a discriminator for discriminating one or more features of the signal, and for producing a control signal when at least one of the features discriminated falls in a predetermined range, and active devices connected to the discriminator. The spatial filter is defined by a semi-spherical bowl having a plurality of openings or by a poly-face prism which is made from a plano-convex lens with its curved face so polished or cut as to have a plurality of flat faces.

8 Claims, 24 Drawing Figures

MONITORING SYSTEM FOR A PREDETERMINED FIELD OF VIEW

BACKGROUND OF THE INVENTION

1. Field of the Invention

The present invention relates to a lift control system, and more particularly, to a system which can detect various events, such as movement of people or articles, fire break out, undesirable heat generation, panics caused by a violence or the like occurring inside a cage or on a floor in front of the cage with its door being opened, and which can control the lift, including the door, in such a manner as to cope with such events.

2. Description of the Prior Art

Conventionally, although there are devices which can detect one particular event of the above described events, no device or system has been proposed which can detect all the events by a single system. According to the prior art, the movement of people or articles including the elevator door is detected, for example, by a photoelectric control or a device utrlizing either an electromagnetic wave or supersonic wave. However, such an electromagnetic wave or supersonic wave may adversely affect signal transmission or even may be harmful to the human body. On the other hand, the presence and absence of people or articles can be detected by a weight detector, but it often makes an erroneous detection when, e.g., children jump around in the cage. A fire is usually detected by any known fire alarm system utilizing a temperature detector or the like. As to panic situations, an alarm system connected to an emergency button is frequently provided, but can be effected only when somebody has pressed the emergency button.

Accordingly, the conventional devices and systems are not only inapplicable for use in a multidetecting system, but also have the various demerits described above.

SUMMARY OF THE INVENTION

It is a primary object of the present invention to provide a lift control system which can detect various events by a single detecting element.

It is another object of the present invention to provide a lift control system which is simple in construction and can readily be manufactured at a low cost.

According to the invention there is provided a lift control system comprising a spatial filter provided inside a cage of the lift, said spatial filter producing a signal having various features, discriminator means for discriminating one or more features of said signal, and for producing a control signal when at least one of said features being discriminated falls within a predetermined range, and active means connected to said discriminating means, said active means being made operative upon receipt of said control signal.

The spatial filter comprises a reticle element for filtering rays emitted or reflected from an object, a lens assembly for converging the rays, and a detector for receiving converged and filtered rays.

The reticle may be presented in a form of fence or checkerboard, or a semi-spherical bowl having a plurality of openings which may serve as a reticle. In each of the openings, a prism may be mounted. The reticle may be defined by a poly-face prism which is made from a plano-convex lens with its curved face so polished or cut as to have a plurality of flat faces.

It is to be noted that the term "spatial filter" used herein is understood as including various filters that can detect a spatial pattern defined not only by the light intensity distribution but also by a medium of other physical amounts, such as temperature. The embodiments disclosed herein are, however, directed to a spatial filter that detects a spatial pattern defined by the light intensity distribution, as an example.

The detector may be sensitive to either light rays or infrared rays. Furthermore, it may be defined by a plain face every place of which is sensitive to rays, or by a stripes of silicon solar cells aligned parallelly to each other with a predetermined pitch, for serving also as a reticle element.

The said various features of the signal produced from the spatial filter are amplitude and frequency of a desired pulsating signal and amplitude of background signal.

Preferably the discriminating means discriminates the amplitude of desired pulsating signal and produces a control signal when the amplitude of the desire pulsating signal exceeds a predetermined high level or falls below a predetermined low level for an indication that an object moving or flickering in the field is brighter or darker than an average brightness, respectively.

According to another preferred embodiment, the discriminating means discriminates the frequency of the desired pulsating signal and produces a control signal when the frequency of the desired pulsating signal exceeds a predetermined frequency for an indication that an object moving in the field is moving faster than an average speed.

Preferably the active means is any one of of the combination of an alarm device, a display device, a broadcast device, a lift drive device and/or a door control which controls the operation of lift's door.

According to a further preferred embodiment, the discriminating means discriminates the amplitude of the background signal and produces a control signal when the amplitude of the background signal falls below a predetermined level for an indication that the background of the field is darker than a predetermined brightness.

Preferably the active means may be a light adjuster for adjusting the light in the cage and/or an auxiliary light control for controlling the power supply to an auxiliary light provided in the cage.

BRIEF DESCRIPTION OF THE DRAWINGS

In order that the invention may be clearly understood and readily carried into effect it will now be more fully described with reference to specific embodiments thereof as illustrated in the accompanying drawings, in which.

Before the description of the present invention proceeds, a fundamental principle of a spacial filter is explained with reference to FIGS. 1, 2 and 3.

Figure 1:
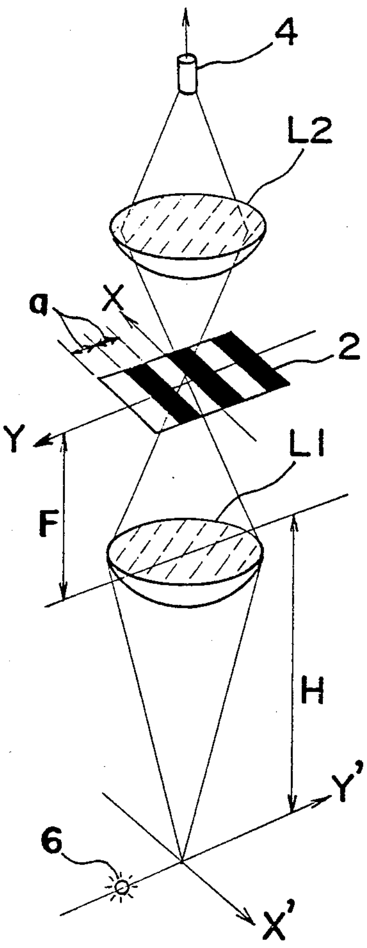
FIG. 1 is a diagrammatic view of a spatial filter arrangement.

Referring to FIG. 1, a spatial filter generally includes an objective lens L1, a condenser lens L2 with its optical axis aligned with that of the objective lens L1, and a field stop 2 located between the lenses L1 and L2, and within an X-Y plane. The field stop, according to an example shown in FIG. 1, is defined by transparent and non-transparent stripes aligned alternately and parallelly to each other in a direction of Y-axis, and each having a width a and extending in a direction of X-axis. Such a field stop 2, as shown in FIG. 1, is called a fence reticle, whereas one shown in FIG. 2 is called a checkerboard reticle.

The spatial filter further includes a detector 4 located on the optical axis and on one side of the condenser lens L2 remote from the field stop 2. The detector 4 is sensitive to rays of light or infrared, and produces an electrical signal relative to the received rays.

When an object 6, shown as a dot light source, moves within an X'-Y' plane spaced a distance H from the objective lens L1, and in a direction of Y'-axis, an image of the object 6 scans over the fence reticle 2 in the Y direction, provided that the objective lens L1 and the fence reticle 2 are spaced a proper focusing distance F. The image of the object 6, which has passed through the fence reticle 2 is again focused on the detector 4 by the condenser lens L2. Accordingly, the detector 4 produces a train of pulses, as shown in FIG. 3. If the velocity of the object 6 is expressed as V, a period T for one cycle of a pulse can be expressed as follows:

$$T = 2aH/FV \qquad (1)$$

When the parameters a and F are given, and when the period T (or frequency 1/T) is known, it is possible to calculate the velocity V. Furthermore, since the amplitude of such pulses is in relation to the intensity of rays emitted from the object 6, it is possible to make an assumption of condition of the object 6. For example, if the detector 4 is sensitive to light rays, the brightness of the object 4 can be determined, and if it is sensitive to infrared rays, the temperature of the object 4 can be determined.

Figure 2:
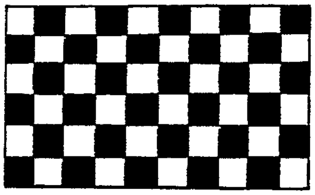
FIG. 2 is a plan view of a checkerboard reticle.
Figure 3:
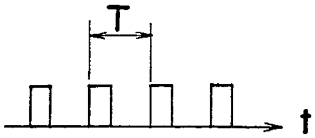
FIG. 3 is a graph showing the waveform of a desired pulsating signal obtained from the spatial filter.

If the checkerboard reticle shown in FIG. 2 is employed in place of the fence reticle, or two sets of optical arrangement of FIG. 1 are employed, it is possible to detect the velocity V of the object 6 not only in Y'-axis direction, but also in all directions within the X'-Y' plane.

Figure 4:
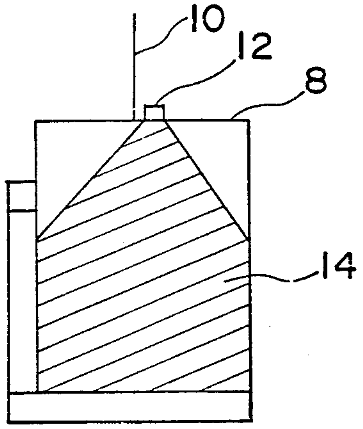
FIG. 4 is a diagrammatic view of a lift.
Figure 5:
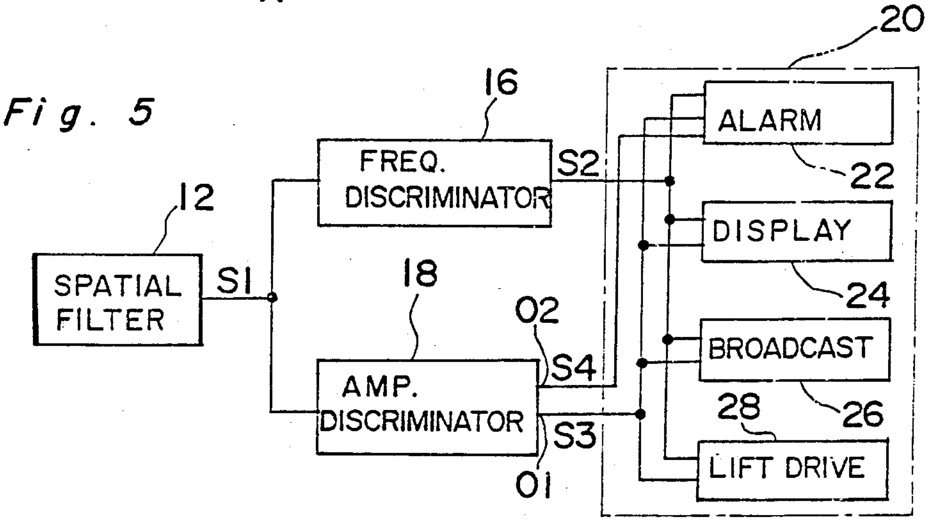
FIG. 5 is a block diagram showing a lift control system according to a first embodiment.

Referring to FIGS. 4 and 5, there is shown one embodiment of a lift control system according to the present invention. In FIG. 4, a reference numeral 8 designates a cage of a lift, 10 designates a main rope for holding the cage 8, and 12 designates a spatial filter which is located on the ceiling of the cage 8 so as to detect any object which falls in its range shown by a shaded section 14. It is to be noted that the spatial filter 12 can be provided at any other portion, for example, on a side wall of the cage 8, so long as its range covers the inside space of the cage 8. It is also to be noted that the range 14 may be changed with respect to the objects to be detected.

FIG. 5 shows a block diagram of the lift control system which includes the spatial filter 12, a frequency discriminator 16, an amplitude discriminator 18, and an emergency control 20. According to the embodiment shown in FIG. 5, the emergency control 20 includes an alarm 22 for producing sound such as buzzer, a display 24 for showing mark or character representing an emergency, a broadcast 26 for giving an announcement of emergency, and a lift drive 28 which controls the movement of the cage 8, for sending the cage 8 to a nearest floor or to a floor giving a calling signal. The frequency discriminator 16 has an input connected to the spatial filter 12 and an output connected to each of alarm 22, display 24, broadcast 26 and lift drive 28. The amplitude discriminator 18 has an input connected to the spatial filter 12 and an output O2 connected to the alarm 22. Another output O1 of the amplitude discriminator 18 is connected to each of alarm 22, display 24, broadcast 26 and lift drive 28.

When some object moves within the range 14 of the spatial filter 12, the spatial filter 12 produces a signal S1 having a frequency determined by the speed of movement of the object and an amplitude determined by the brightness of the object. If the object is one or more people and when they are taking the lift in a usual manner, their movements are rather slow. Thus, in this case, the signal S1 has a low frequency corresponding to the slow movement of people. On the other hand, if there is some serious matter, for example violence of crime, takes place in the cage 8, the people in the cage 8 make quick movements. In this case, the signal S1 will have a frequency higher than the above mentioned frequency. The frequency discriminator 16 detects such a high frequency and produces an emergency signal S2 to the emergency control 20. When the emergency control 20 receives an emergency signal S2 from the frequency discriminator 16, the alarm 22 is actuated to produce a buzzering inside the cage 8 and outside the cage 8, preferably at a building keeper's office, and the display 24 is actuated to produce a visual signal, such as a luminous sign saying "EMERGENCY". Furthermore the broadcast 26 is actuated to give an announcement, such as so-and-so lift is in an emergency, and at the same time, the lift drive 28 is so actuated as to advance the cage 8 to the nearest floor or to the floor from which the calling signal is given and to open the door.

When a fire breaks out in the cage 8, the brightness inside the cage 8 becomes brighter than usual, and in this case, the amplitude discriminator 18 detects that the amplitude of the signal S1 is higher than a predetermined level and produces an emergency signal S3 to each devices 22, 24, 26 and 28 in the emergency control 20 to give out an emergency sign of fire break out and to advance the cage to the nearest floor.

On the other hand, when the amplitude of the signal S1 becomes lower than a predetermined level, as occurred when there is smoke in the cage 8, when the lights in the cage 8 are out or when someone has covered the light receiving face of the spatial filter or the lights, the amplitude discriminator 18 produces an emergency signal S4 which is applied to alarm 22 of the emergency control 20. The reason why the signal S4 is not applied to other devices in the emergency control 20 is because the matter is not so serious as others mentioned above.

It is to be noted that the emergency control 20 may have other warning or control devices which will be helpful to cope with the serious matters.

It is also to be noted that any one of alarm 22, display 24 or broadcast 26 can be connected to a police station or a similar organization.

It is further to be noted that the emergency control 20 may be so arranged that the timing for actuating the devices 22, 24, 26 and 28 may be varied. For example, the alarm 22 is actuated instantly to the generation of the emergency signal, whereas the display 24 is actuated a short period of time after the generation of the emergency signal, provided that the emergency signal is still present. Furthermore, if the emergency signal lasts still longer, the broadcast 26 may be actuated after the actuation of the display 24. In this manner, one may evaluate how serious the matter is.

Figure 6:
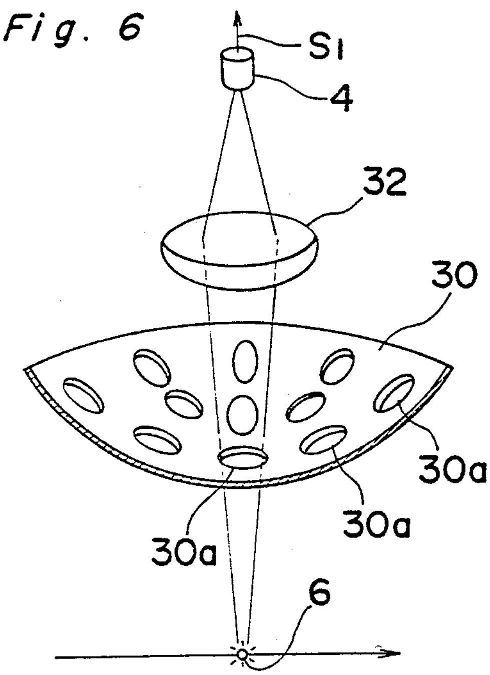
FIG. 6 is a diagrammatic view of a modification of the spatial filter employing a semi-spherical bowl.
Figure 7:
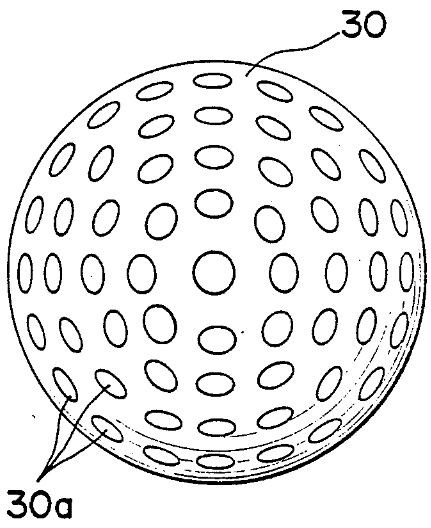
FIG. 7 is a bottom plan view of the semi-spherical bowl.

Referring to FIGS. 6 and 7, there is shown an optical arrangement of the spatial filter. The arrangement shown includes a semi-spherical bowl 30 having a plurality of circle openings 30*a* formed therein for permitting the light pass, a convex lens 32, and the detector 4 sensitive to light rays. It is to be noted that the semi-spherical bowl 30 serves as the checkboard reticle shown in FIG. 2. When the object 6 moves in the direction shown by an arrow, the light rays emitted or reflected from the object 6 reach the detector 4 intermittently, and accordingly, the detector 4 produces a pulsating signal S1 similar to that shown in FIG. 3. As understood to those skilled in the art, the pulsating signal S1 will be carried on a certain level determined by the surrounding lights that go into the detector 4.

It is to be noted that the number of circle openings 30*a* is not limited to those shown in FIG. 7 but can be any other number, and that the circles can be disposed in any other manner.

Figure 8:
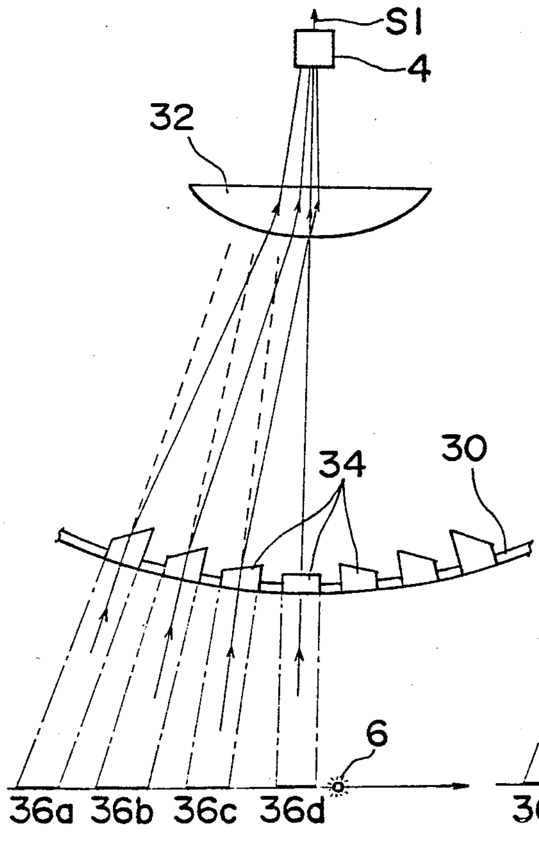
FIG. 8 is a diagrammatic view of another modification of the spatial filter having a plurality of prisms mounted in the semi-spherical bowl.

Referring to FIG. 8, there is shown another optical arrangement of the spatial filter. When compared with the arrangement of FIG. 6, the arrangement shown in FIG. 8 further includes cylindrical prism elements 34 fittingly mounted in the circle openings 30*a*. A cylindrical prism in the centre of the semi-spherical bowl 30 has its opposite faces in parallel to each other, whereas other cylindrical prisms have their face facing the detector 4 inclined in such a manner as to orient the edge containing an acute angle towards the centre of the bowl 30. The degree of inclination of the face becomes greater as the distance to the centre of the bowl 30 becomes longer. Accordingly, the light rays, which have passed through the cylindrical prism 34, direct towards the centre of the convex lens 32. When the object 6 moves in the direction shown by an arrow, the light rays emitted or reflected from the object 6 reach the detector 4 only when the object 6 is located in regions 36*a*, 36*b*, 36*c*, 36*d*, . . . Accordingly, the detector 4 receives the light rays from the objects 6 intermittently, and thus produces a pulsating signal similar to that shown in FIG. 3.

Figure 9:
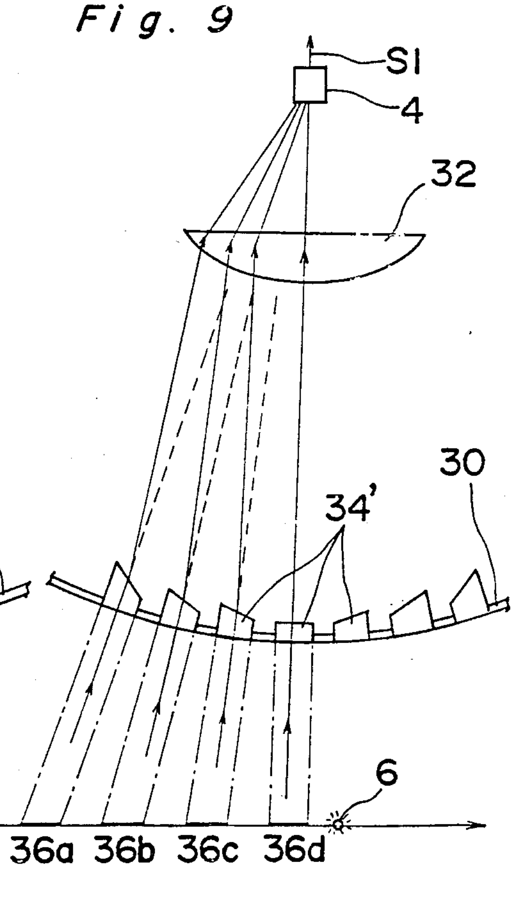
FIG. 9 is a view similar to FIG. 8, but particularly shows prisms having different configuration.

Referring to FIG. 9, there is shown a further optical arrangement of the spatial filter. When compared with the arrangement of FIG. 8, the faces of the cylindrical prisms 34' are inclined in opposite direction. Accordingly, the light rays, which have passed through the cylindrical prisms 34', direct towards the convex lens 32 almost parallel to each other.

When the optical arrangement of FIGS. 8 or 9 is employed, the light rays from the object 6 can be effectively gathered by the convex lens 32, and accordingly, it is possible to reduce the area of light receiving face of the detector 4. Furthermore, a signal-to-noise ratio in the signal S1 can be improved.

It is to be noted that in the optical arrangements of FIGS. 6 to 9 the openings 30*a* and prisms 34 and 34', which have been described as having a circle configuration, can be formed in any other shape, such as a rectangular. Furthermore, the prisms 34 and 34' can be formed in any other shape so long as they provide necessary refraction.

Figure 10:
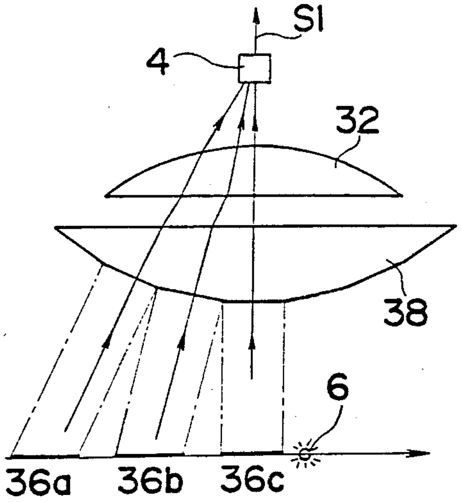
FIG. 10 is a diagrammatic view of a further modification of the spatial filter employing a poly-face prism.
Figure 11:
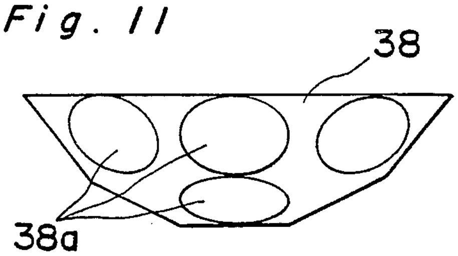
FIG. 11 is a side plan view of the poly-face prism.
Figure 12:
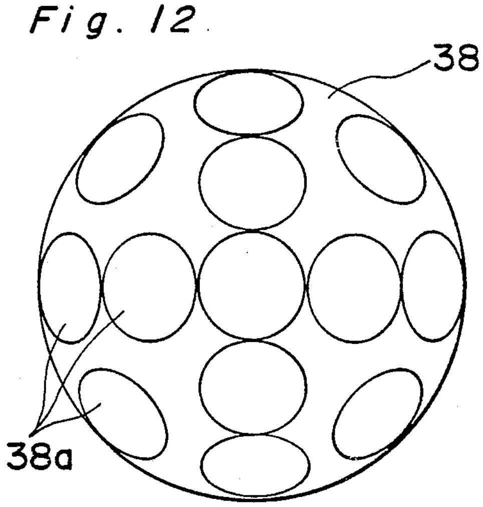
FIG. 12 is a bottom plan view of the poly-face prism.

Referring to FIGS. 10, 11 and 12, there is shown a still further optical arrangement of the spatial filter. The arrangement shown includes detector 4, convex lens 32 and poly-face prism 38. The poly-face prism 38 is made from a plano-convex lens with its curved face so polished or cut as to have a plurality of circle flat faces or facets 38*a*, as best shown in FIGS. 11 and 12. Since the flat faces 38*a* have different angle with respect to the optical axis, only the lights from particular regions 36*a*, 36*b*, 36*c*, . . . pass through the poly-face prism 38. Accordingly, the poly-face prism 38 serves as the checkerboard reticle shown in FIG. 2.

It is to be noted that the number of cut faces 38*a* is not limited to those shown in FIG. 11 but can be any other number. Furthermore, the disposition, shape and size of the cut faces 38*a* can be made in any other manner. For example, the cut faces 38*a* may have a shape of polygon.

In the optical arrangement described above in connection with FIGS. 8 and 10, the convex lens 32 can be eliminated. Thus, the spatial filter can be made compact in size.

It is to be noted that the poly-face prism 38 described above in connection with FIGS. 11 and 12 is not an ordinary reticle element. It is a novel and newly invented reticle element which has refraction effect. Therefore, the poly-face prism 38, employed as a reticle element, can receive lights in wide solid angle. Furthermore, when the poly-face prism 38 is employed, a detector 4 having a plain light receiving face, i.e., a light receiving face having no particular pattern, can be used.

Moreover, it is not necessary to employ a differential amplifier as in a detector 40 described below.

Figure 13:
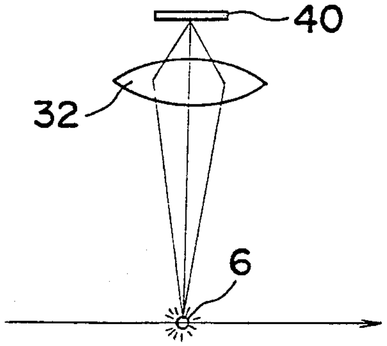
FIG. 13 is a diagrammatic view of a still further modification of the spatial filter employing a silicon solar cell arranged in stripes.
Figure 14:
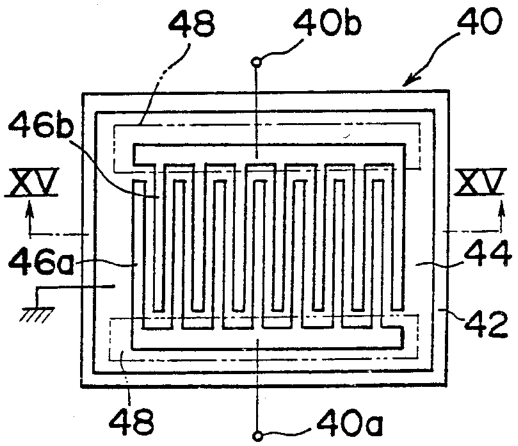
FIG. 14 is a bottom plan view of the silicon solar cell.
Figure 15:
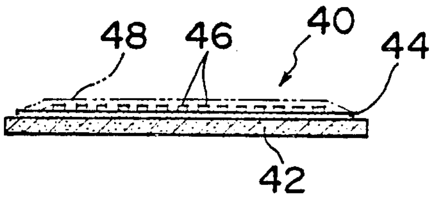
FIG. 15 is a cross sectional view taken along a line XV—XV shown in FIG. 14.

Referring to FIGS. 13, 14 and 15, there is shown yet another optical arrangement of the spatial filter. The arrangement shown includes a convex lens 32 and a detector 40. The detector 40, as best shown in FIGS. 14 and 15, is formed by a base plate 42 made of ceramics or the like material, an N type silicon layer 44 deposited almost entirely on the base plate 42, and a P-type silicon layer 46 deposited on the N-type silicon layer 44. The P-type silicon layer 46 is formed by two sections 46*a* and 46*b* (FIG. 14) each formed in a shape of comb, and their teeth are interleaved with each other. In the P-type silicon layer 46, sections from which the teeth are extending are covered by a tape or bonding agent 48 for preventing light rays from being impinged thereon. As understood to those skilled in the art, the detector 40 according to the arrangement described above is defined by a plurality of stripes of silicon solar cells aligned parallelly to each other with a predetermined pitch. Thus, the detector 40 serves also as a fence reticle.

The detector 40, when used in association with a differential amplifier, is particularly suitable for eliminating background noise signals, such as that caused by the day light that adds dc signal or the artificial light that adds fluctuating signal of 50 or 60 cycles per second depending on the frequency of commercial ac power.

Figure 16:
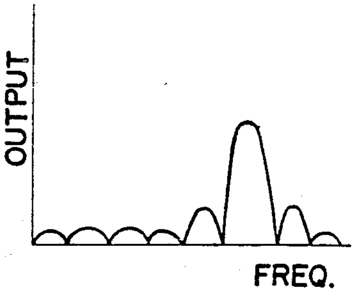
FIG. 16 is a graph showing a signal spectrum of signal obtained from a silicon solar cell shown in FIG. 14.

FIG. 16 shows signal spectrum of signal obtained from the detector 40 of FIG. 14. By the arrangement as shown in FIG. 14 and taking the difference between the outputs, it is possible to obtain a spatial frequency characteristic having a single peak point.

In contrast to the detector 40, the detector 4 employed in the spatial filter arrangements of FIGS. 1, 6, 8, 9 and 10 have a plain photoelectric element.

Figure 17:
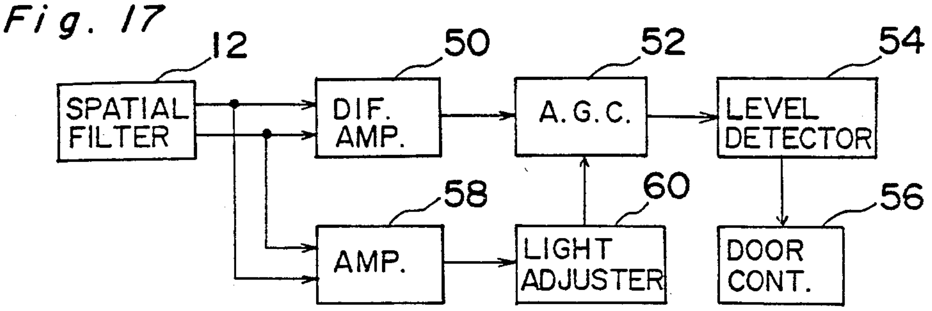
FIG. 17 is a block diagram showing a lift control system according to a second embodiment of the invention.
Figure 18:
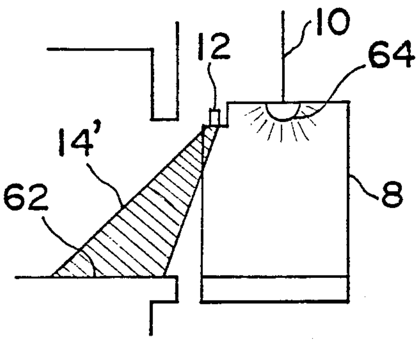
FIG. 18 is a diagrammatic view of a lift having the lift control system of FIG. 17.

Referring to FIGS. 17 and 18, there is shown a lift control system according to a second embodiment of the present invention. The system shown is particularly designed for controlling the operation of the door in relation to the people who are at a waiting area in front of the lift's door. Also, the system of this embodiment employs the spatial filter arrangement described above in connection with FIGS. 13, 14 and 15.

According to this embodiment which controls the door movement, it is preferable to employ the fence reticle and to dispose the reticle's stripes in parallel relation to the movement of the door so as to prevent the detection of door movement, or people or object that moves in the same direction as the door movement. The system includes a spatial filter 12, a differential amplifier 50, an automatic gain control 52, a level detector 54 and a door control 56, which are connected in cascade. The system further includes an amplifier 58 connected to the spatial filter 12 and an adjusting linearizer 60 connected between the amplifier 58 and the automatic gain control 52. As shown in FIG. 18, the spatial filter 12 has a detecting range 14' which can cover a waiting area 62 located in front of the lift's door in each floor.

The differential amplifier 50 is provided for eliminating the background noise signals and for producing only the wanted signal representing the presence and movement of the object. The amplifier 58 adds the signals from the spatial filter 12, and produces a signal representing the brightness of background set up by a light 64 provided in the cage 8 and/or by the lights in the floor.

The adjusting linearizer 60 includes a photocoupler linearizer for adjusting the proportional relation between brightness and the automatic gain control 52, so as to change the slope of the proportional relation.

The signal representing the brightness of the background produced from the amplifier 60 is also applied to the automatic gain control 52 for making the wanted signal independent of the change in the brightness of the background. More particularly, when the brightness of the background exceeds the predetermined level, the amplitude of the wanted signal is reduced by the rate determined by the exceeded degree of brightness, and when the brightness of the background falls below the predetermined level, the amplitude of the wanted signal is increased by the rate determined by the degree of lacking. Therefore, the automatic gain control 52 produces a wanted signal which does not take into account any influence from the fluctuation or variation of the background light.

The level detector 54 receives wanted signal from the automatic gain control 52 and produces a control signal when the wanted signal exceeds a predetermined level. The said predetermined level is set to a level obtained when an object having a relatively low reflectivity moves slowly in the waiting area 62. During the cage 8 being at a floor ready for taking people in and when the level detector 54 produces a control signal, the door control 56 is actuated such that the lift's door is maintained open and the timing for automatically closing the door is prolonged.

Next, the operation of the lift control system according to the second embodiment is explained. When the cage 8 stops at the floor illustrated, the lift's door (not shown) is opened automatically by a known means, and it is maintained open for a predetermined period of time. If the people in the waiting area 62 move into the cage 8 within said predetermined period of time, no pulsating signal is produced during a last bit of time within said predetermined period of time. In this case, the door closes automatically and the cage 8 advances to the floor of destination. On the other hand, if there are some people left in the waiting area 62 moving towards the cage 8 at said last bit of time, the spatial filter 12 detects the movement of the people in the waiting area 62, and accordingly, the wanted signal, i.e., a pulsating signal having a frequency determined by the speed of movement of the people and an amplitude determined by the reflectivity of the people is produced from the automatic gain control 52. Since the frequency and amplitude of the generated pulsating signal is greater than those set up in the level detector 54, the level detector 54 produces a control signal to the door control 56 within said predetermined period of time. Thus, the door control 56 is so actuated as to prolong the timing for closing the door.

Then, when the door is about to close, the lift control system shown in FIG. 17 is made inactive, or the door control 56 disregards any further control signal from the level detector 54, to prevent an erroneous operation caused by the door movement regarded as the movement of people at the waiting area.

It is to be noted that by making the detecting range 14' narrower in terms of direction of door movement and by holding the lift control system of FIG. 17 active until just before the door intrudes into the narrow range 14', the lift control system of FIG. 17 can be so designed as to allow the spatial filter 12 to detect people who have dashed to the waiting area 62 even during the closure of the door. In this case, the lift control system detects such a movement of people and reopens the door even after the door has started to close.

It is also to be noted that the adjusting linearizer 60 can be eliminated from the system shown in FIG. 17 or that the automatic gain control 52 can be so designed as to serve also as the light adjuster 60.

It is further to be noted that the automatic gain control 52 and the adjusting linearizer 60 can be eliminated and that the output of the amplifier 58 can be connected to the level detector 54 for controlling the signal level of the wanted signal in the level detector 54 by the use of signal from the amplifier 58.

It is still further to be noted that the amplifier 58, which is shown as receiving two signals from the spatial filter 12, can be designed as to receive only one signal from the spatial filter 12.

As understood from the foregoing description, the lift control system of FIG. 17 will not detect people who are only standing in the waiting area 62, that is, people who have no intention to take the lift.

Figure 20:
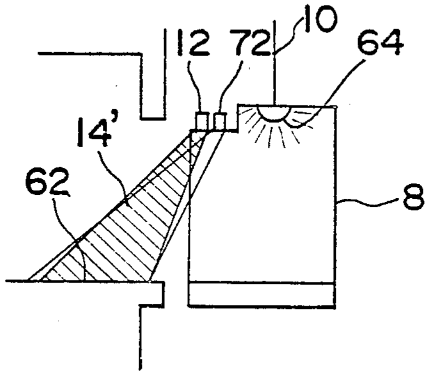
FIG. 20 is a diagrammatic view of a lift having the lift control system of FIG. 19.
Figure 19:
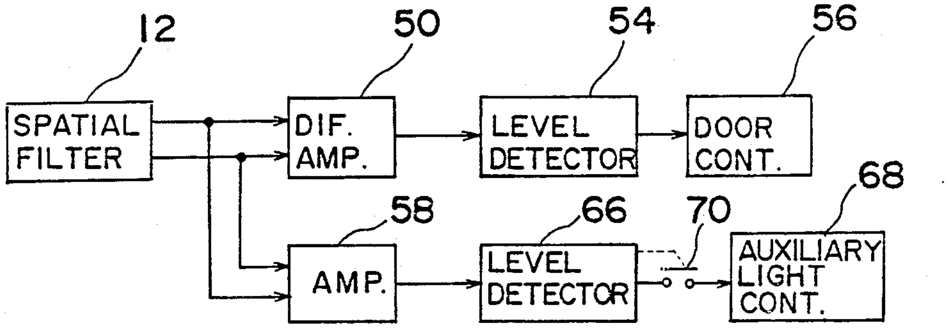
FIG. 19 is a block diagram showing a modification of the lift control system of FIG. 17.

Referring to FIGS. 19 and 20, there is shown a lift control system which is a modification of the system shown in FIGS. 17 and 18. When compared with the system of FIG. 17, the system shown in FIG. 19 has no automatic gain control 52 and adjusting linearizer 60, but instead it has another level detector 66 connected to the amplifier 58 and an auxiliary light control 68 connected to the level detector 66 through a relay switch 70 which is normally held open. The level detector 66 receives a signal representing the brightness of background from the amplifier 58, and when it detects that the brightness of background is below a predetermined level, it is so actuated as to close the switch 70 for actuating the auxiliary light control 68. The auxiliary light control 68 is connected to an auxiliary light 72 shown in FIG. 20. Accordingly, when the auxiliary light control 68 is actuated, i.e., the switch 70 is turned on, the auxiliary light 72 is turned on for illuminating particularly the waiting area 62. The switch 70 opens in response to the complete closure of the door. Accordingly, when the auxiliary light 72 is turned on, it is maintained on until the closure of the door.

In operation, when the cage 8 stops at a floor shown in FIG. 20, the door automatically opens and the people in the waiting area 62 move into the cage 8. During this moment, if the waiting area 62, for some reason or other, becomes darker than the required brightness, the background signal produced from the amplifier 58 decreases in level. When the background signal falls below a predetermined level, the level detector 66 is so actuated as to close the switch 70. Accordingly, the auxiliary light control 68 is actuated to supply power to the auxiliary light 72, so that the waiting area 62 can be maintained brighter than the required brightness. In this case, when there are some people still left in the waiting area 62 moving towards the cage 8, the spatial filter 12 produces pulsating signal which has an amplitude sufficiently high to be detected by the level detector 54. Accordingly, the door control 56 controls the door in a similar manner described above without any failure.

According to the lift control system described above in connection with FIGS. 19 and 20, the employment of auxiliary light not only prevents the lift control system from making an erroneous operation as often occurred when the wanted signal, i.e., the pulsating signal representing people in the waiting area 62 moving towards the cage 8, becomes indistinguishable over the background signal, but also lightens the footing to make people feel easy.

The auxiliary light, which has been described as being turned off in response to the closure of the lift's door, may be turned off after a set period of time from the closure of the switch 70.

Figure 21:
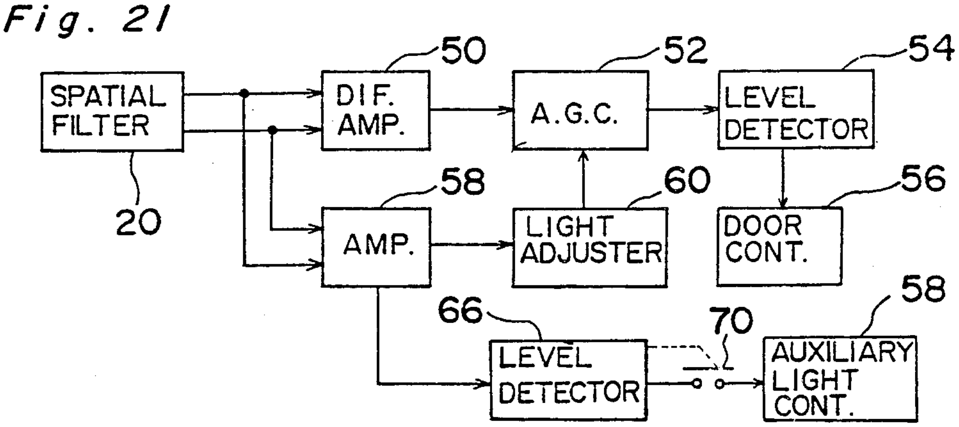
FIG. 21 is a block diagram showing a further modification of the lift control system of FIG. 17.

It is to be noted that the lift control system of FIG. 19 can be combined with that of FIG. 17, as shown in FIG. 21. Since the dynamic range of the differential amplifier 50 or automatic gain control 52 is limited to a certain degree, there may be a case wherein the level detector 54 fails to detect the wanted signal. But when the auxiliary light is employed, the wanted signal produced from the automatic gain control 52 becomes distinctively high, allowing the detection of wanted signal with high reliability.

Figure 22:
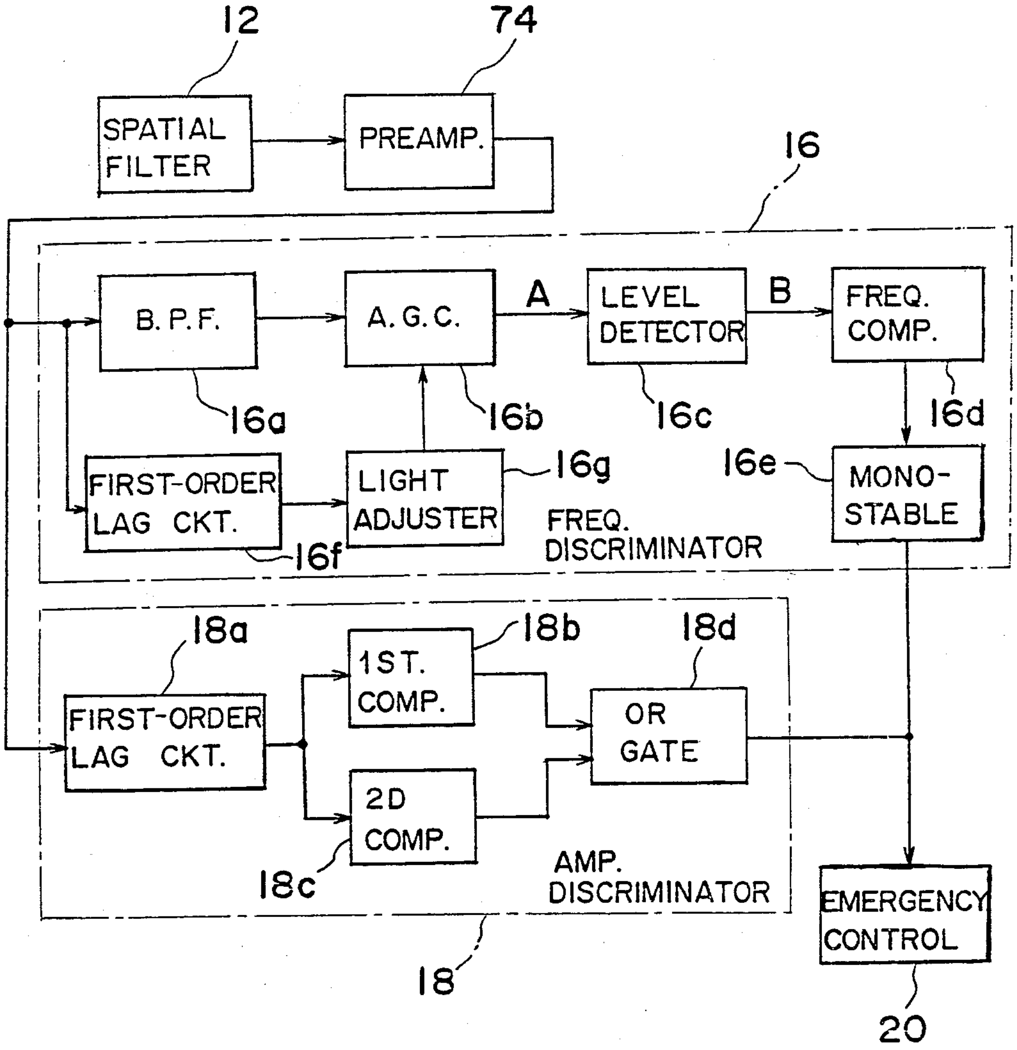
FIG. 22 is a block diagram showing a detail of the lift control system of FIG. 5.

Referring to FIG. 22, there is shown an example of lift control system of the first embodiment shown in FIG. 5. The lift control system shown includes the spatial filter 12 of any kind described above and a preamplifier 74 connected to the spatial filter 12. The output of the preamplifier 74 is connected to the frequency discriminator 16 and also to the amplitude discriminator 18. The outputs of these discriminators 16 and 18 are connected to the emergency control 20.

Figure 24:
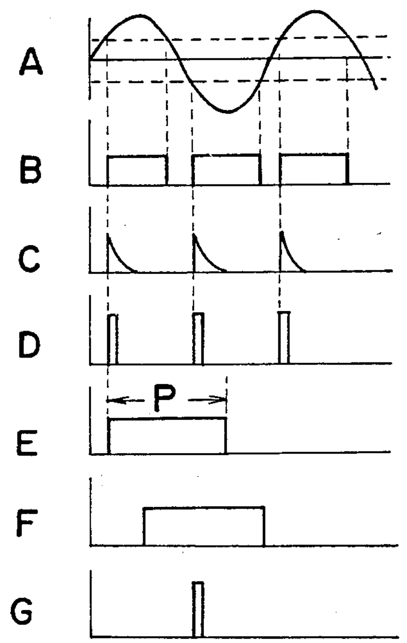
FIG. 24 is a graph showing waveforms obtained from majour points in the circuit of FIG. 23.

The frequency discriminator 16 includes a band pass filter 16*a*, an automatic gain control 16*b*, a level detector 16*c*, a frequency comparator 16*d* and a monostable multivibrator 16*e* which are connected in cascade between the preamplifier 74 and emergency control 20. It further includes a time lag of first-order circuit 16*f* connected to the preamplifier 74, and an adjusting linearizer 16*g* connected between the time lag of first-order circuit 16*f* and the automatic gain control 16*b*. The band pass filter 16*a* eliminates the background signal and supplies only the wanted signal to the automatic gain control 16*b*. The time lag of first-order circuit 16*f* receives a signal from the preamplifier 74 and smooths the signal level. When the signal from the preamplifier 74 is considered from the view point of waveform, the wanted signal occupies much less area than the area of the background signal. Accordingly, the smoothed signal produced from the time lag of first-order circuit 16*f* can be considered as an average signal of the background signal. The adjusting linearizer 16*g* and the automatic gain control 16*b* receive the average signal of background from the time lag of first-order circuit 16*f*, and operate in a similar manner described above in connection with FIG. 17. Accordingly, the automatic gain control circuit 16*b* produces the wanted signal which is not affected by the fluctuation of ambient light. An example of waveform of the wanted signal produced from the automatic gain control 16*b* is shown in FIG. 24 under a heading A. Such a waveform is referred to as a waveform A, and so as the other waveforms. The level detector 16*c* has two threshold levels: high and low. It produces a high level signal when the wanted signal (waveform A) exceeds the high threshold level and also when the same falls below the low threshold level. Thus, it can be said that only the wanted signal having a relatively high amplitude is transmitted through the level detector 16*c*. According to the example, the level detector 16*c* produces a signal having a waveform B, as shown in FIG. 24. The frequency comparator 16*d* compares the frequency of the wanted signal transmitted through the level detector 16*c* with a predetermined frequency, and the monostable multivibrator 16*e* produces a pulse when the frequency of the wanted signal surpasses the predetermined frequency. Accordingly, when the monostable multivibrator 16e produces a pulse, it is understood that the object detected by the spatial filter 12 is moving faster than a predetermined speed. The pulse produced from the monostable multivibrator 16e is, applied to the emergency control 20.

Figure 23:
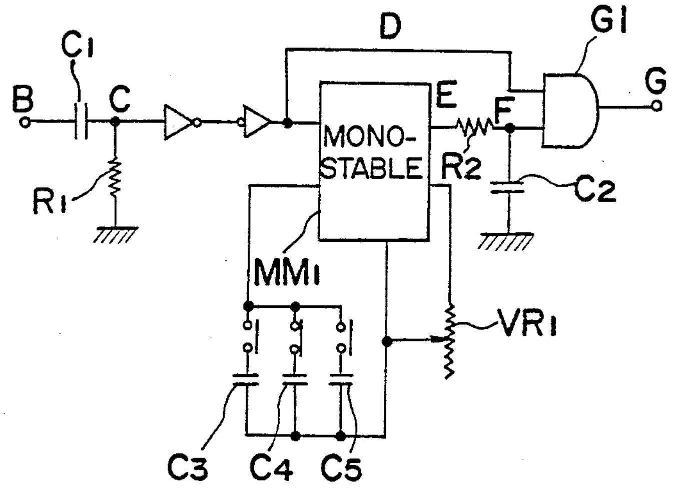
FIG. 23 is a circuit diagram of frequency comparator employed in the lift control system of FIG. 22.

Referring to FIG. 23, there is shown an example of the frequency comparator 16d. The circuit shown includes a differentiating circuit defined by a capacitor C1 and resistor R1, a monostable multivibrator MM1, a delay circuit defined by a resistor R2 and a capacitor C2, and an AND gate G1. When the signal (waveform B) from the level detector 16c is applied, the differentiating circuit produces a pulsating signal having waveform C as shown in FIG. 24. This signal (waveform C) is shaped in a rectangular form (waveform D) by a pair of inverters and is applied to the monostable multivibrator MM1 and also to one input of the AND gate G1. Then, stable multivibrator MM1 produces a single shot pulse (waveform E) having a pulse duration P determined by a variable resistor VR1 and capacitors C3, C4 and C5. The single shot pulse (waveform E) is delayed by the delay circuit, and the delayed pulse (waveform F) is applied to the other input of the AND gate G1. When there is a pulse, within the duration of delayed pulse (waveform F), from the inverter, it is transmitted through the AND gate G1 (waveform G). When the frequency of the wanted signal (waveform A) becomes low, the pulse interval of the pulse signal (waveform D) becomes longer. In this case, no pulse will be produced from the AND gate G1.

Referring again to FIG. 22, the amplitude discriminator 18 includes a first-order lag circuit 18a, a first comparator 18b, a second comparator 18c and an OR gate 18d. The first-order lag circuit 18a smooths the signal from the preamplifier 74 in a similar manner described above for producing an average signal of background. The first comparator 18b compares the average signal with a predetermined high level signal. When the average signal surpasses the predetermined high level signal, the first comparator 18b produces a signal which is applied through the OR gate 18d to the emergency control 20. On the other hand, the second comparator 18c compares the average signal with a predetermined low level signal. When the average signal falls below the predetermined low level signal, the second comparator 18c produces a signal which is also applied to the emergency control 20.

As understood from the foregoing description given in connection with FIG. 5, the monostable multivibrator 16e produces a pulse when people in the cage 8 make a quick motion when some unexpected event occurs. The first comparator 18b produces a signal when a fire breaks out in the cage 8, and the second comparator 18c produces a signal when smoke fills up the cage 8.

The emergency control 20 is understood as identical to that described above in connection with FIG. 20.

Since the lift control system according to the present invention employs a spatial filter, a number of different matters can be detected without any additional sensor or the like.

Accordingly, the lift control system can be prepared compact in size and simple in structure with low manufacturing cost.

Furthermore, since only the light or infrared rays are involved in the detection, there will be no interference to the radio wave or no harm to the human body.

Although the present invention has been fully described with reference to preferred embodiments, many modifications and variations thereof will now be apparent to those skilled in the art.

What is claimed is:

1. A condition detecting device for detecting various conditions within a predetermined field angle, said condition detecting device comprising:

(a) a spatial filter element including a solid poly-facet prism member having a convex face on the side of the fields of view with a plurality of plano facts cut into said convex face for permitting trasmittal of rays therethrough from an object to define respective separate fields of view for each facet;

(b) a single converging lens element for converging the rays which have passed through the spatial filter element;

(c) sensor means for sensing said rays converged by said converging lens element and for producing a signal having various features depending on the condition of said object; and (d) discriminating means for discriminating one or more features of said signal.

2. A condition detecting device as claimed in claim 1, wherein said sensor means is sensitive to infrared rays.

3. A condition detecting device as claimed in claim 1, wherein said sensor means has a plane face sensitive to said rays.

4. A condition detecting device as claimed in claim 1, wherein said sensor means is sensitive to infrared rays.

5. A condition detecting device as claimed in claim 4, wherein said sensor means has a plane face sensitive to said rays.

6. The invention of claim 1 wherein said converging lens element is a plano-convex lens with its convex face facing said sensor means.

7. The invention of claim 6 wherein said solid prism has a plano-convex configuration with the plano face adjacent the plano face of the plano-convex lens.

8. An improved lift control system for transporting people comprising:

(a) a cage member for supporting the people;

(b) means for supporting the cage member for movement;

(c) a spatial filter provided inside the cage member for detecting various conditions within a predetermined field angle, said spatial filter comprising:

(i) a spatial filter element defined by a solid polyfacet prism member having a convex face on the side of the fields of view with a plurality of planofacets cut into said convex face, said spatial filter element provided for filtering rays emitted or reflected from an object, with each facet defining separate fields of view;

(ii) a lens assembly for converging the rays which have passed through the spatial filter element; and (iii) sensor means for sensing the converged and filtered rays, said spatial filter Producing a signal having various features representative of the conditions within the field angle;

(d) discriminating means for discriminating at least one feature of said signal, and for producing a control signal when at least one of said features being discriminated falls within a predetermined range; and (e) means responsive to said control signal from said discriminating means for effecting an operation related to said lift control system.

* * * * *